US011347899B2

(12) United States Patent
Donohue (10) Patent No.: US 11,347,899 B2
(45) Date of Patent: May 31, 2022

(54) DYNAMIC MEMORY SCRAMBLER

(71) Applicant: Realtek Singapore Private Limited, Singapore (SG)

(72) Inventor: Ryan Patrick Donohue, Sunnyvale, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 227 days.

(21) Appl. No.: 16/703,831

(22) Filed: Dec. 4, 2019

(65) Prior Publication Data

US 2021/0173964 A1 Jun. 10, 2021

(51) Int. Cl.
  *G06F 21/79* (2013.01)
  *G06F 12/14* (2006.01)
  *H04L 9/08* (2006.01)
  *G06F 21/72* (2013.01)

(52) U.S. Cl.
  CPC .......... *G06F 21/79* (2013.01); *G06F 12/1408* (2013.01); *G06F 21/72* (2013.01); *H04L 9/0861* (2013.01)

(58) Field of Classification Search
  CPC ...... G06F 21/79; G06F 12/1408; G06F 21/72; G06F 21/85; G06F 21/71; G06F 2212/1052; H04L 9/0861; H04L 9/0891; H04L 9/0894
  See application file for complete search history.

(56) References Cited

U.S. PATENT DOCUMENTS

| 4,551,580 | A  | * | 11/1985 | Cox      | H04K 1/00    |
|           |    |   |         |          | 380/36       |
| 7,284,133 | B2 | * | 10/2007 | Watanabe | G06Q 20/341  |
|           |    |   |         |          | 713/189      |
| 8,555,082 | B1 | * | 10/2013 | Bibikar  | H04L 9/0618  |
|           |    |   |         |          | 713/189      |
| 9,304,944 | B2 | * |  4/2016 | Pong     | G06F 12/1441 |
| 2008/0152142 | A1 | * | 6/2008 | Buer    | G06F 12/1408 |
|           |    |   |         |          | 380/270      |
| 2008/0205640 | A1 | * | 8/2008 | Shen-Orr | G06Q 20/10  |
|           |    |   |         |          | 380/35       |

(Continued)

FOREIGN PATENT DOCUMENTS

EP  2375355 A1 * 10/2011 ......... G06F 12/1408
TW  201512839 A     4/2015

*Primary Examiner* — Shanto Abedin (74) *Attorney, Agent, or Firm* — McClure, Qualey & Rodack, LLP (57) ABSTRACT

A memory data scrambling system that can dynamically rescramble the contents of a memory while the system is in operation includes an application-specific integrated circuit (ASIC) that has an ASIC bus fabric, a double data rate (DDR) memory controller coupled to the ASIC bus fabric, a dynamic memory scrambler coupled to the DDR memory controller, the dynamic memory scrambler comprising a scrambler, a descrambler, a scrambler selection table, and a key generator and a DDR PHY coupled to the dynamic memory scrambler. The DDR PHY is coupled to an external DDR memory external to the ASIC. The dynamic memory scrambler includes a refresh timer that, upon expiration, causes data in a region of the DDR to be read, descrambled, rescrambled using a different scrambling key, and stored back into the region of the DDR in place of a DDR refresh.

12 Claims, 6 Drawing Sheets

(56) References Cited

U.S. PATENT DOCUMENTS

| | | | |
|---|---|---|---|
| 2008/0288785 A1* | 11/2008 | Rao | G06F 21/72 |
| | | | 713/190 |
| 2010/0070681 A1* | 3/2010 | Wan | G06F 12/0246 |
| | | | 711/103 |
| 2013/0036312 A1* | 2/2013 | Anquet | G06F 21/78 |
| | | | 713/189 |
| 2013/0262880 A1* | 10/2013 | Pong | G06F 21/79 |
| | | | 713/193 |
| 2014/0325235 A1* | 10/2014 | Thompson | G06F 21/6218 |
| | | | 713/189 |
| 2020/0201785 A1* | 6/2020 | Hanna | G06F 11/1004 |

* cited by examiner

DYNAMIC MEMORY SCRAMBLER

BACKGROUND OF THE INVENTION

1. Field of the Invention

This application relates to a memory data scrambling system, and more specifically to a memory data scrambling system that can dynamically rescramble the contents of a memory while the system is in operation.

2. Description of the Prior Art

In some systems, it is important that information stored in external DDR (double data rate) memories be encrypted or scrambled so that its contents can be secure against external observation. Encryption or scrambling of data in the external DDR interface of ASICs (application-specific integrated circuit) has been done using a number of methods in previous chips. Some chips use an AES (Advanced Encryption Standard) or similar crypto engine in line with the DDR pipe so that all data stored in DDR is encrypted. Other chips use scrambling methodologies where a scrambling method is selected and the data stored in DDR is scrambled using that method.

However, both of the above methods have the downside that once a scrambling or encryption method is selected for a region of the DDR, this same method is statically used at all times. This makes it venerable to attacks and cryptanalysis.

SUMMARY OF THE INVENTION

A memory data scrambling system that can dynamically rescramble the contents of a memory while the system is in operation is proposed. The system comprises an integrated circuit (ASIC) that has a bus fabric, a memory controller coupled to the bus fabric, a dynamic memory scrambler coupled to the memory controller, the dynamic memory scrambler comprising a scrambler, a descrambler, a scrambler selection table, and a key generator and a physical PHY interface coupled to the dynamic memory scrambler. The physical PHY interface is coupled to a memory external to the IC.

Another proposed memory data scrambling system that can dynamically rescramble the contents of a memory while the system is in operation comprises an external memory and an integrated circuit (IC). The IC includes a bus fabric, a memory controller coupled to the bus fabric, a dynamic memory scrambler coupled to the memory controller, and a physical interface coupled the external memory. The dynamic memory scrambler comprises a scrambler, a descrambler, a key generator configured to produce scrambling keys utilized to scramble and unscramble data, a coordination circuit that coordinates scrambling and descrambling of data and dynamic key changes utilized for rescrambling of scrambled data in the external memory using a different scrambling key while the system is operating, and a scrambler selection table configured to track which memory locations of the external memory are scrambled with which scrambling key.

A method of data rescrambling in a memory system is also proposed. The memory system comprises an external memory coupled to a dynamic memory scrambler; the dynamic memory scrambler comprises a scrambler, a descrambler, a scrambler selection table, a refresh timer, and a scrambling key generator. The method comprises the refresh timer expiring and selecting a region of the external memory comprising first data to be rescrambled. The data is read from the region of the external memory and descrambled utilizing a first scrambling key associated with the region according to the scrambler selection table to form first data. The key generator generates a second scrambling key different than the first scrambling key the second scrambling key is associated with the region in the scrambler selection table. The first data is scrambled utilizing the second scrambling key to generate second data and the second data is transmitted to the region of the external memory.

These and other objectives of the present invention will no doubt become obvious to those of ordinary skill in the art after reading the following detailed description of the preferred embodiment that is illustrated in the various figures and drawings.

DETAILED DESCRIPTION

This invention proposes a significant enhancement to the DDR scrambling scheme used in other chips, which increases security: dynamic scrambling keys that change while the system is operating.

This invention allows regions of the DDR to be scrambled in such a way that they can be changed and rescrambled using different scrambling algorithms/polynomials while the system is operating. This imposes no additional overhead on the rest of the memory subsystem and therefore does not affect functional performance.

From a security point of view, this dynamic rescrambling of the contents of the DDR poses a major difficulty for opponents that are trying to discover the contents of the DDR. The key change process can occur at any time (when viewed from the outside of the chip) and when it changes any progress on cracking the previous key is now worthless.

Proposed is a memory data scrambling system that can dynamically rescramble the contents of a memory while the system is in operation. The memory data scrambling system does not cause performance degradation of the memory system because the memory content rescrambling may occur as part of the usual refresh operation of DDR. The memory scrambling system provides a method in which the contents of the memory are rescrambled at unpredictable times. The memory data scrambling system provides a method where the number of scramblers that can be used in any given memory region is selectable. The memory data scrambling system further provides a method in which the choice of scrambler algorithm/polynomial can be selected randomly.

Figure 1:
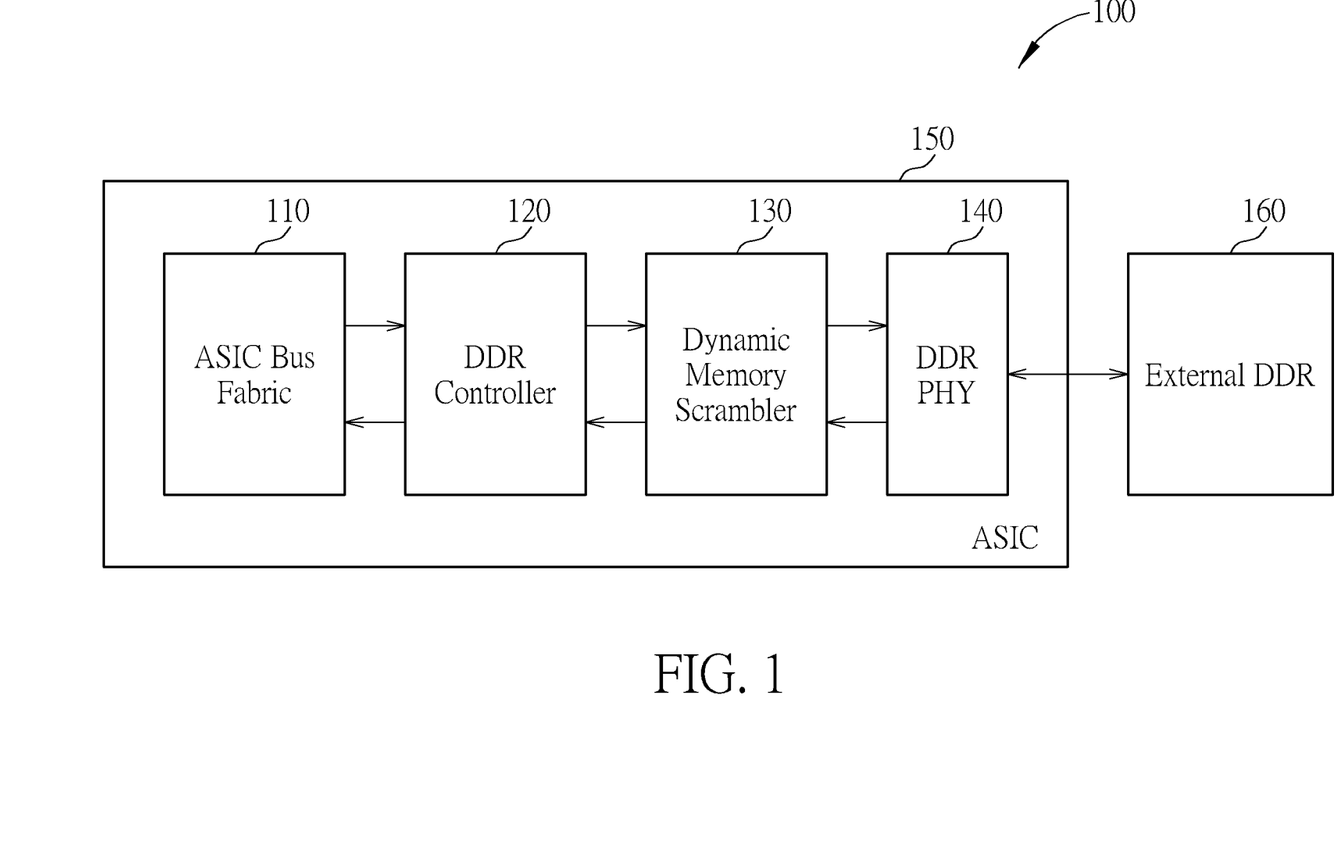
FIG. 1 is a functional block diagram of a Dynamic Memory Scrambler, which is part of the external memory subsystem of an ASIC, according to an embodiment of the present invention.

The Dynamic Memory Scrambler is a block of logic, which is part of the external memory subsystem of an integrated circuit, IC (e.g., CPU, application-specific integrated circuit, (ASIC)). A typical configuration would be as shown in FIG. 1. The system 100 includes an IC 150 coupled to an external memory 160 (e.g., DDR memory). The external memory 160 is the memory that holds the data that is scrambled and/or rescrambled in the invention. Although scrambling data and encrypting data may be viewed by some as different processes, for the purposes of this invention, forms of the terms scramble and encrypt are used interchangeably and refer to both processes, for example any reversible reordering and/or coding of signals or data.

Continuing with FIG. 1, the IC 150 comprises a Bus Fabric 110, a memory controller 120, and a PHY interface 140 (physical interface) coupled to the external memory 160. Structures and functions of these elements 110, 120, 140, and 160 are known to those skilled in the art and need not be further discussed here. What is new in the IC 150 according to the invention is the Dynamic Memory Scrambler 140, where the Dynamic Memory Scrambler 130 is located between the memory controller 120 and the PHY interface 140. Data destined to be stored in the External memory 160 is transmitted from the Bus Fabric 110, to the memory Controller 120, then to the Dynamic Memory Scrambler 130 where it is scrambled/encrypted, then the scrambled/encrypted data is transmitted to the PHY interface 140, and finally to the External DDR 160. Data read from the External DDR 160 may be retrieved from the system 100 in reverse of the above-described order. The Dynamic Memory Scrambler 130 further includes components necessary to receive Write requests and Read requests along with respective memory addresses.

Figure 2:
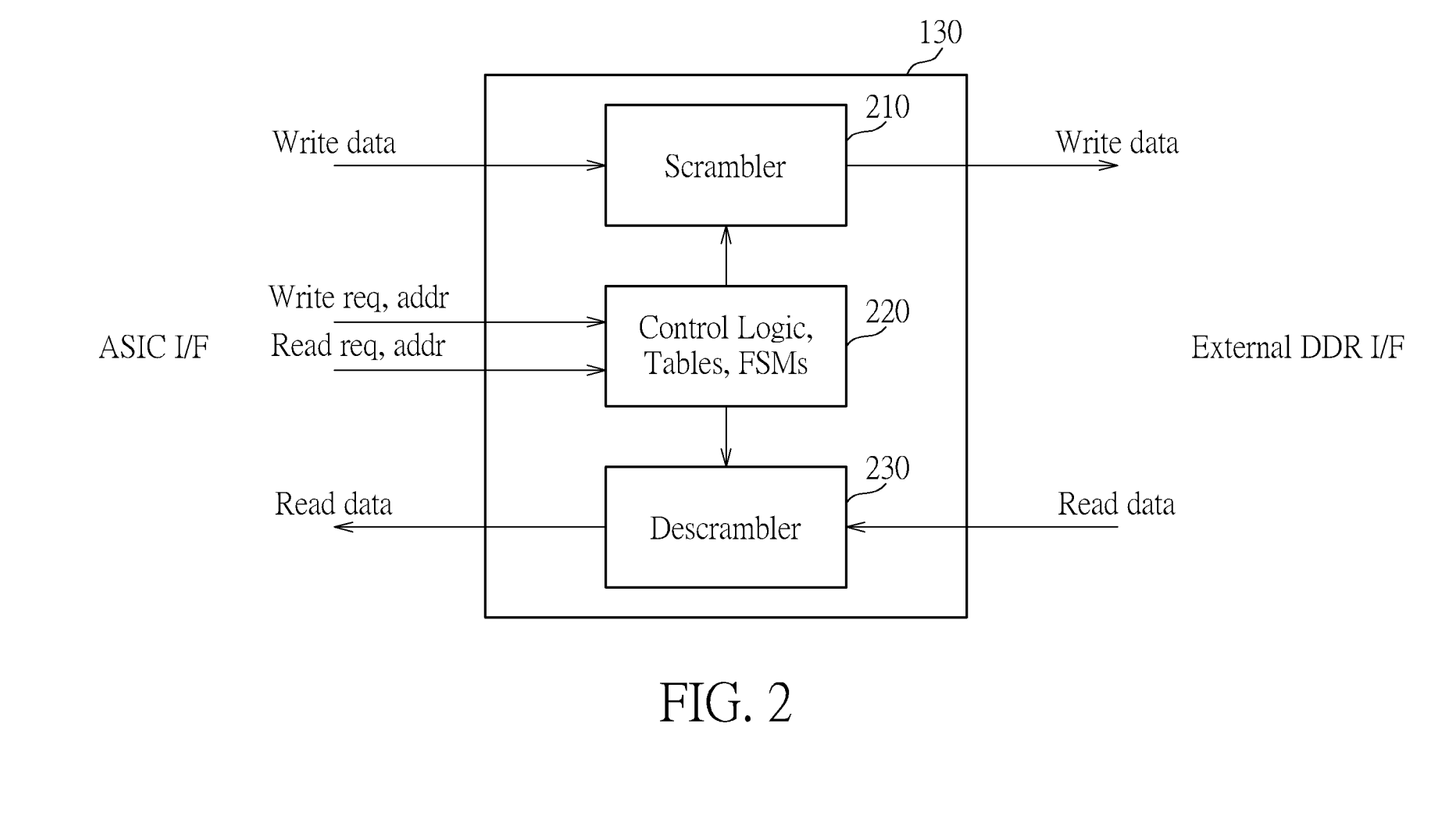
FIG. 2 illustrates the Dynamic Memory Scrambler of FIG. 1.

As shown in FIG. 2, the Dynamic Memory Scrambler 130 includes two data paths. One data path processes data that is being sent from the ASIC 150 into the External DDR 160 memory [write data path]. In this direction, the Dynamic Memory Scrambler 130 can scramble/encrypt the data using certain mechanisms that then cause the data to be stored in the External DDR 160 in a manner, which is unreadable to external monitors. In the other data path [read data path], the Dynamic Memory Scrambler 130 unscrambles/decrypts data which is being read from the External DDR 160 in a manner which is exactly the inverse of the manner in which the data was scrambled/encrypted. This allows the data to be returned to the ASIC 150 correctly.

Figure 3:
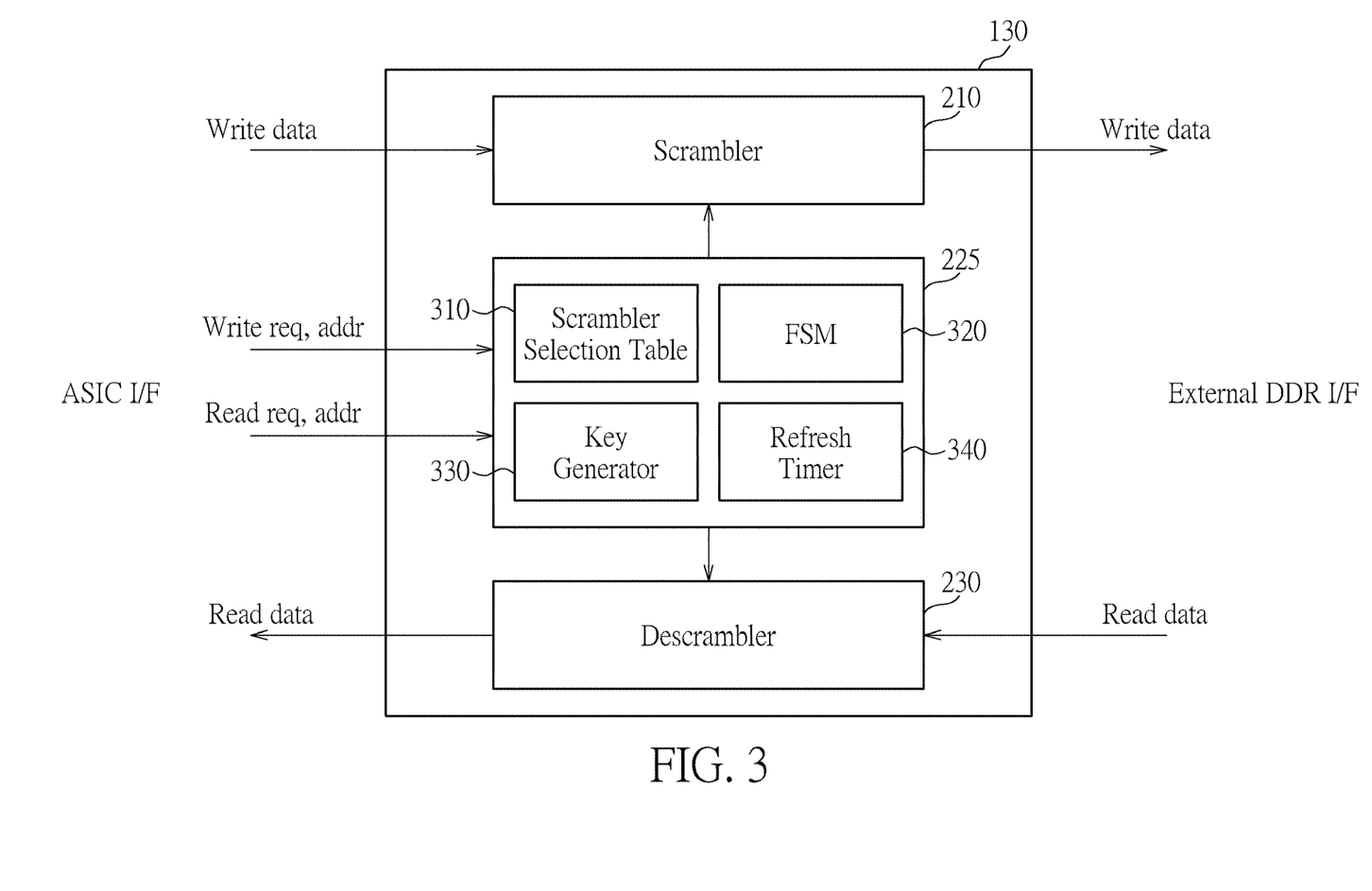
FIG. 3 is a functional block diagram of the Dynamic Memory Scrambler of FIG. 1 in detail.

Inside the Dynamic Memory Scrambler 130 there is an area 220/225 comprising key generation mechanisms, state machines, and the Scrambler Selection Table that facilitate the scrambling/unscrambling process as shown in FIG. 3. The key generator 330 produces scrambling keys, which are used to scramble and unscramble data. The Scrambler Selection Tables 310 track which memory locations are scrambled with which keys. The FSMs (Finite State Machine) coordinate the scrambling/descrambling and the dynamic key changes, which allow the scrambled data in the DDR to be rescrambled while the system is operating. The FSMs coordinate the timing of this scrambling/rescrambling so that, in some embodiments, it can be done in place of DDR refresh in order to improve performance.

The Dynamic Memory Scrambler 130 operates based on parameters that are defined at the time the system 100 is designed. Two key parameters are (1) how many scrambling polynomials will be used, and (2) what granularity of data scrambling will be supported (scrambling region size). The number of scrambling polynomials defined control how many possible scrambled representations of the data can exist in the system 100. The granularity of the data scrambling will determine how large the tables need to be to track the scrambling state of each data region. For example, an implementation might choose 4 scrambling polynomials and 128B scrambling granularity. This means that each 128B region of the memory can contain data scrambled with 1 of the 4 possible scrambling polynomials. As in this case, the exact polynomial used is a specific region of the memory may be the same or different as the exact polynomial used is different region of the memory.

The Dynamic Memory Scrambler 130 contains a Scrambler Selection Table 310 which stores an indicator for which scrambling polynomial is being used for each region. The table 310 may be initially seeded with random values so that at system 100 startup time it is unpredictable which scrambling polynomial is being used for each region.

When a piece of data is to be written to the external DDR 160 memory, the data appears on the write data path along with the write address. The Dynamic Memory Scrambler 130 maps the write address to the appropriate scrambling region. It then queries the table 130 that contains which scrambler polynomial to use to scramble the data. The Dynamic Memory Scrambler 130 then scrambles the data appropriately and sends it to the external DDR 160 memory.

Figure 4:
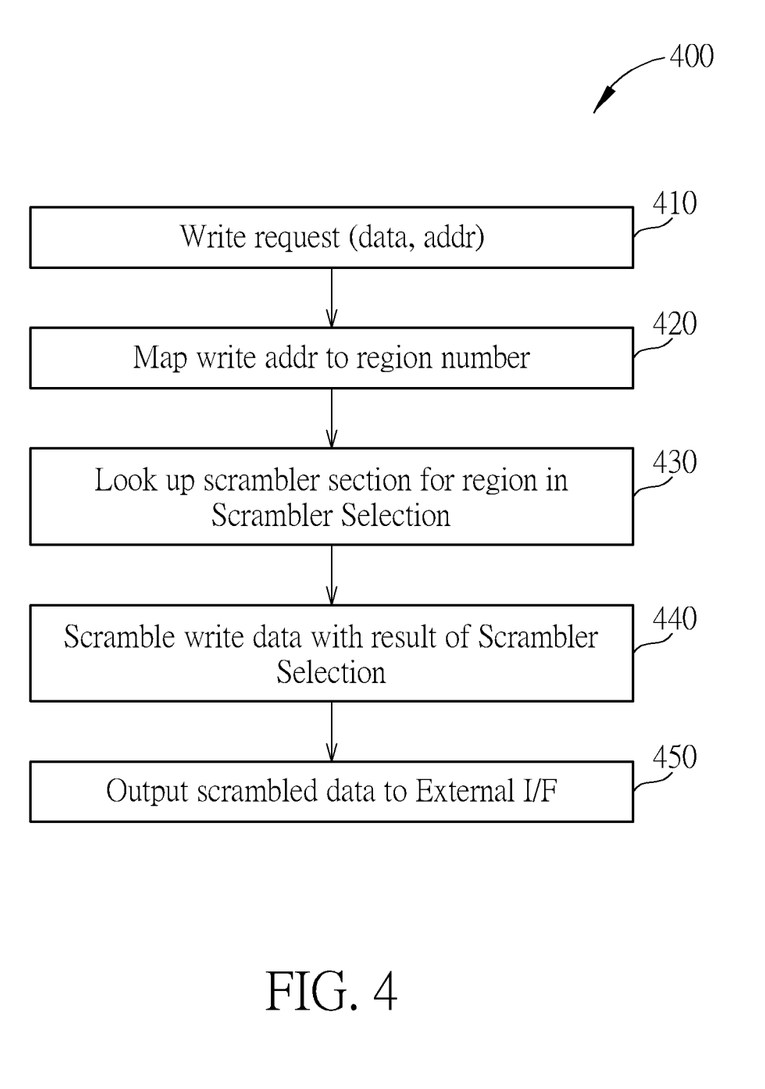
FIG. 4 illustrates a Dynamic Memory Write Flowchart showing an example write process according to an embodiment of the present invention.

FIG. 4 illustrates a Dynamic Memory Write Flowchart 400 showing an example write process. Flowchart 400 includes:

Step 410: The Dynamic Memory Scrambler 130 receives the Write request (data, addr);

Step 420: The Dynamic Memory Scrambler 130 maps the write addr to region number;

Step 430: The Dynamic Memory Scrambler 130 looks up scrambler section for region in Scrambler Selection Table 310;

Step 440: The Dynamic Memory Scrambler 130 scrambles the write data with result of Scrambler Selection Table 310; and Step 450: The Dynamic Memory Scrambler 130 outputs the scrambled data to External DDR 160 I/F (interface).

When a piece of data needs to be read from External DDR 160 memory, the read request appears on the read data path along with the read address. The Dynamic Memory Scrambler 130 maps the read address to the appropriate scrambling region. It then queries the Scrambler Selection Table 310 that contains the scrambler polynomial that was used to scramble the data in that region. The Dynamic Memory Scrambler 130 then unscrambles the data read from External DDR 160 memory using the appropriate polynomial (as indicated in the Scrambler Selection Table 310) and sends it to the ASIC 150.

Figure 5:
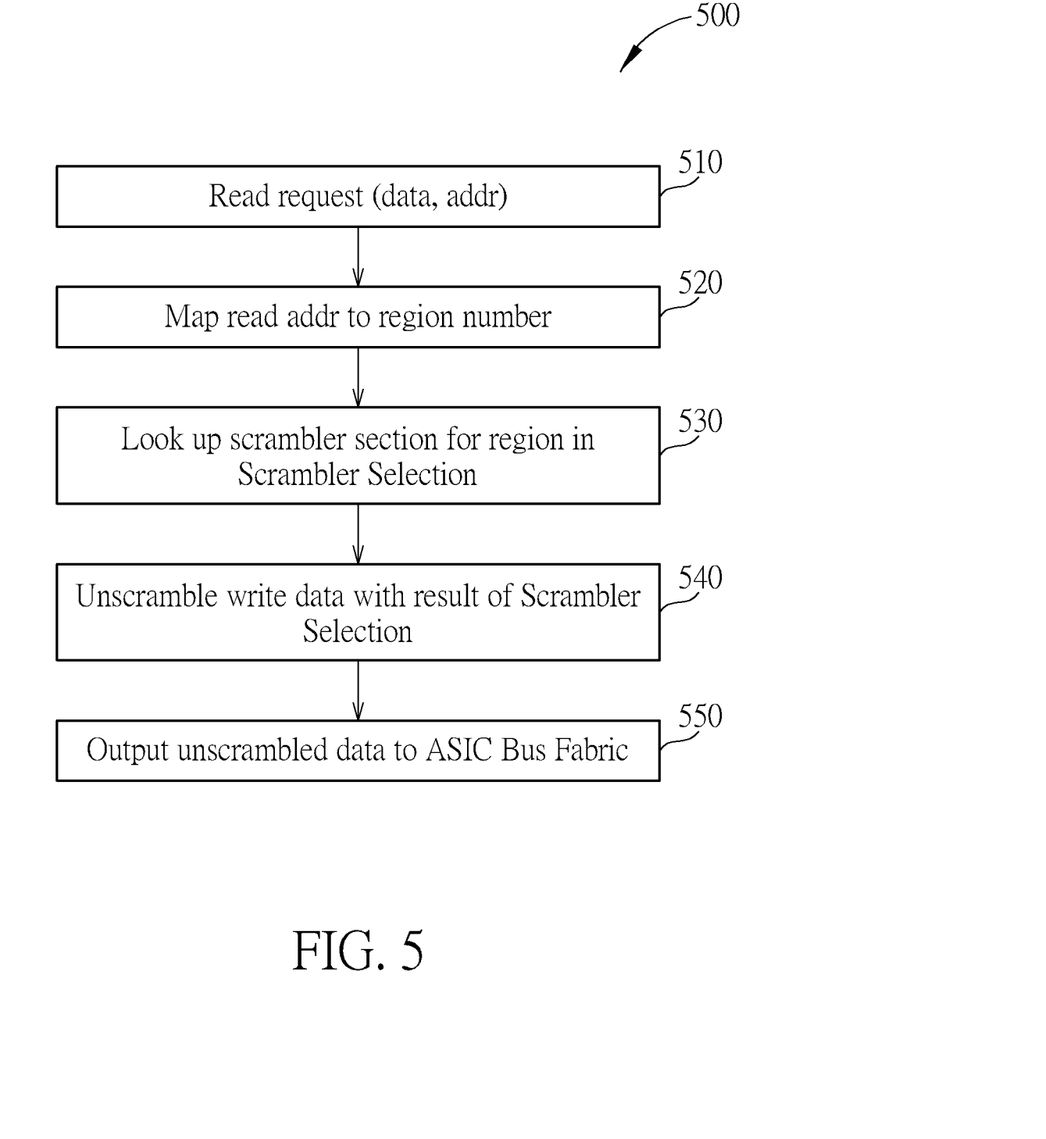
FIG. 5 is a flowchart of reading data from the External DDR memory according to an embodiment of the present invention.

FIG. 5 is a Flowchart 500 of reading data from the External DDR 160 memory and includes:

Step 510: The Dynamic Memory Scrambler 130 receives the Read request (data, addr);

Step 520: The Dynamic Memory Scrambler 130 maps the Read addr to region number;

Step 530: The Dynamic Memory Scrambler 130 looks up scrambler section for region in Scrambler Selection Table 310;

Step 540: The Dynamic Memory Scrambler 130 unscrambles the data read from the External DDR 160 memory with result of Scrambler Selection Table 310; and Step 550: The Dynamic Memory Scrambler 130 outputs the unscrambled data to the ASIC Bus Fabric 110.

Rescrambling data in the External DDR 160 including reading the scrambled data from the External DDR 160, descrambling and rescrambling the read data using a different polynomial, and writing the rescrambled data back to the External DDR 160 as well as updating relevant tables 310 generally happens pretty quickly. However, some embodiments include a method of conflict resolution to deal with situations where a read or write request is received during a rescrambling procedure. An example of such conflict resolution may be not to start a rescrambling operation until a current read/write process has ended although other methods could be used.

Some embodiments include all of the above and further schedule rescrambling times to coincide with DDR refresh times to save from operational downtime. External memories like DDRs need to be periodically refreshed in order for them to retain data. The Dynamic Memory Scrambler 130 handles this. The FSM 320 inside the Dynamic Memory Scrambler 130 comprises a refresh counter 340 that is programmed to refresh regions of the External DDR 160 memory at a programmable interval. When the interval expires, the Dynamic Memory Scrambler 130 selects a region to refresh. The scrambler selection table 310 is checked for that region and then selects a different scrambler to the one that is currently stored in the table 310. The FSM 320 then conducts a read of the External DDR 160 region and unscrambles the read data using the old scrambler selection, and then scrambles unscrambled data using the new scrambler selection. It then writes this data back to the External DDR 160 and then updates the Scrambler Selection Table 310 with the new scrambler selection.

Figure 6:
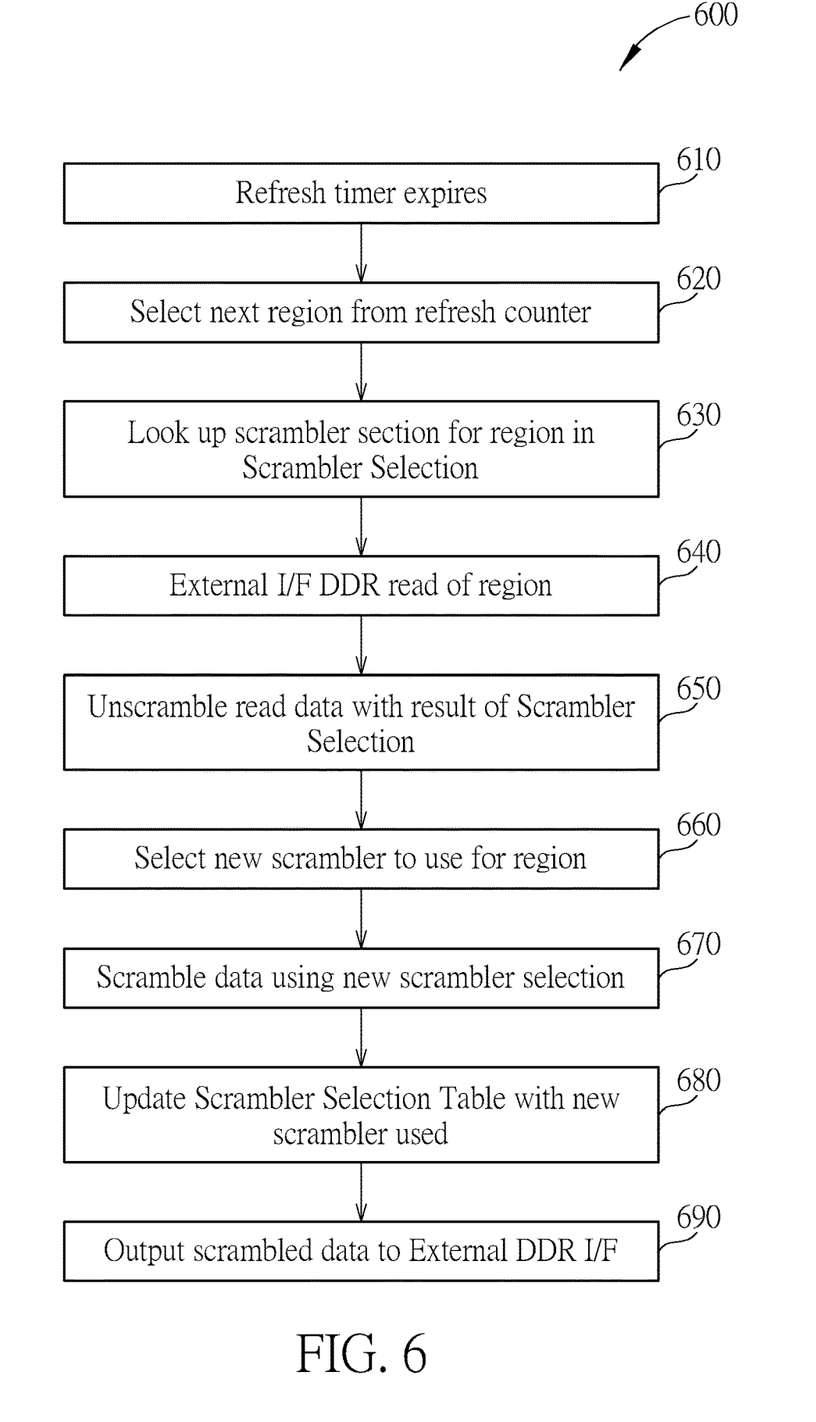
FIG. 6 is a flowchart of a timed rescrambling procedure according to an embodiment of the present invention

FIG. 6 is a flowchart 600 of a timed rescrambling procedure that includes:

Step 610: Refresh timer expires;

Step 620: Select next region from refresh counter;

Step 630: Look up scrambler section for region in Scrambler Selection Table 310;

Step 640: Read data in the region of the External DDR 160;

Step 650: Unscramble read data with result of Scrambler Selection Table 310;

Step 660: Select new scrambler to use for the region

Step 670: Scramble data using new scrambler selection;

Step 680: Update Scrambler Selection Table 310 with new scrambler used; and Step 690: Output the scrambled data to External DDR 160 I/F.

Since this DDR rescrambling takes place as part of the DDR refresh sequence the performance loss of reading/writing the region is low. This allows data in the DDR to be dynamically rescrambled while the system is in operation with no penalty. Because the time between DDR memory refreshes are fairly short, the system can be designed to rescramble the data every refresh, at each N number of refreshes, at random numbers of refreshes, or at other frequencies such as a user designated rate.

The specific method of unscrambling and rescrambling of data as previously described can vary depending upon implementation. For example, the choice of which scrambler algorithm/polynomial can be selected randomly or rotated such as through the use of the FSM. The number of scramblers that can be used in any given memory region may be user selectable. Additionally, the contents of the memory are rescrambled at either periodic or unpredictable times.

The rescrambling of data stored in an External DDR memory vastly increases security of a system by reducing the amount of time a hacker would have to break the encryption before having to start all over again. The utilization of the proposed rescrambling replacing DDR refresh times ensures that minimum time is lost to the system due to the rescrambling. As such, the proposed memory data scrambling system can dynamically rescramble the contents of a memory while the system is in operation without causing performance degradation of the memory system because the rescrambling of memory contents occur as part of the usual refresh operation of the DDR.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory data scrambling system comprising:
an integrated circuit (IC) comprising:
a bus fabric;
a memory controller coupled to the bus fabric;
a dynamic memory scrambler coupled to the memory controller, the dynamic memory scrambler comprising a scrambler, a descrambler, a scrambler selection table, and a key generator, wherein the scrambler selection table is configured to track which memory locations of the external memory are scrambled with which scrambling key; and
a physical (PHY) interface coupled to the dynamic memory scrambler; and
an external memory external to the IC and coupled to the PHY interface,
wherein the IC further comprises a coordination circuit that coordinates scrambling and descrambling of data and dynamic key changes utilized for rescrambling of scrambled data in the external memory using a different scrambling key while the system is operating, wherein the coordination circuit is a finite state machine (FSM), and
wherein the dynamic memory scrambler further comprises a refresh timer configured to cause the coordination circuit to coordinate timing of scrambling and rescrambling to be done in place of a double data rate (DDR) memory refresh.

2. The memory data scrambling system of claim 1, wherein the key generator is configured to produce scrambling keys that are used to scramble and unscramble data.

3. The memory data scrambling system of claim 1, wherein the scrambler selection table tracks which memory locations of the external memory are scrambled with which scrambling key.

4. The memory data scrambling system of claim 1, wherein rescrambling of scrambled data in the external memory using a different scrambling key while the system is operating comprises: selecting a region of the external memory comprising first data to be rescrambled; reading the first data from the region of the external memory;
descrambling the first data utilizing a first scrambling key associated with the region according to the coordination circuit;
the key generator generating a second scrambling key different than the first scrambling key and associating the second scrambling key with the region in the coordination circuit;
scrambling the unscrambled first data utilizing the second scrambling key to generate second data; and transmitting the second data to the region of the external memory.

5. The memory data scrambling system of claim 1, wherein the dynamic memory scrambler is further configured to rescramble data of the region in place of a randomly selected DDR memory refresh or a periodically selected DDR memory refresh.

6. A memory data scrambling system comprising:
an external memory and
an integrated circuit (IC) comprising:
   a bus fabric;
   a memory controller coupled to the bus fabric;
   a dynamic memory scrambler coupled to the memory controller, the dynamic memory scrambler comprising:
   a scrambler;
   a descrambler;
   a key generator configured to produce scrambling keys utilized to scramble and unscramble data;
   a coordination circuit that coordinates scrambling and descrambling of data and dynamic key changes utilized for rescrambling of scrambled data in the external memory using a different scrambling key while the system is operating, wherein the coordination circuit is a finite state machine (FSM); and
   a scrambler selection table configured to track which memory locations of the external memory are scrambled with which scrambling key; and
a physical interface coupled between the dynamic memory scrambler and the external memory,
wherein the dynamic memory scrambler further comprises a refresh timer configured to cause the coordination circuit to coordinate timing of scrambling and rescrambling to be done in place of a double data rate (DDR) memory refresh,
wherein the dynamic memory scrambler further comprises a coordination circuit which coordinates scrambling and descrambling of data and dynamic key changes utilized for rescrambling of scrambled data in the external memory using a different scrambling key while the system is operating.

7. The memory data scrambling system of claim 6, wherein rescrambling of scrambled data in the external memory using a different scrambling key while the system is operating comprises:
selecting a region of the external memory comprising first data to be rescrambled;
reading the first data from the region of the external memory;
descrambling the first data utilizing a first scrambling key associated with the region according to the scrambler selection table;

the key generator generating a second scrambling key different than the first scrambling key and associating the second scrambling key with the region in the scrambler selection table;
scrambling the unscramble first data utilizing the second scrambling key to generate second data; and
transmitting the second data to the region of the external memory.

8. The memory data scrambling system of claim 6, wherein the dynamic memory scrambler is further configured to rescramble data of the region in place of a randomly selected DDR memory refresh or a periodically selected DDR memory refresh.

9. A method of data rescrambling in a memory system, the memory system comprises an external memory coupled to a dynamic memory scrambler, the dynamic memory scrambler comprising a scrambler, a descrambler, a scrambler selection table, a refresh timer, and a scrambling key generator, the method comprising: the refresh timer expiring and selecting a region of the external memory comprising first data to be rescrambled;
reading the first data from the region of the external memory;
descrambling the first data utilizing a first scrambling key associated with the region according to the scrambler selection table;
the key generator generating a second scrambling key different than the first scrambling key and associating the second scrambling key with the region in the scrambler selection table;
scrambling the descrambled first data utilizing the second scrambling key to generate second data;
using the refresh timer to coordinate the descrambling and scrambling operations in a finite state machine (FSM) circuit, in place of a double data rate (DDR) memory refresh; and
transmitting the second data to the region of the external memory.

10. The method of claim 9, further comprises rescrambling the data while the system IS operating.

11. The method of claim 10, further comprising the refresh timer expiring and selecting a region of the external memory in place of a double data rate (DDR) memory refresh.

12. The method of claim 11, further comprising the refresh timer expiring and selecting a region of the DDR memory in place of a randomly selected DDR memory refresh or a periodic DDR memory refresh.

* * * * *